US008398901B2

(12) United States Patent
Beck et al.

(10) Patent No.: US 8,398,901 B2
(45) Date of Patent: Mar. 19, 2013

(54) METHOD FOR PRODUCING IRIDESCENT SOLID NANOCRYSTALLINE CELLULOSE FILMS INCORPORATING PATTERNS

(75) Inventors: Stephanie Beck, Montreal (CA); Jean Bouchard, Montreal (CA); Richard Berry, Notre-Dame-de-L'lle Perrot (CA)

(73) Assignee: FPinnovations, Pointe Claire, QC (CA)

( * ) Notice: Subject to any disclaimer, the term of this patent is extended or adjusted under 35 U.S.C. 154(b) by 749 days.

(21) Appl. No.: 12/591,906

(22) Filed: Dec. 4, 2009

(65) Prior Publication Data
US 2010/0151159 A1 Jun. 17, 2010

Related U.S. Application Data

(60) Provisional application No. 61/193,619, filed on Dec. 11, 2008.

(51) Int. Cl.
*B29D 11/00* (2006.01)
*B29C 39/38* (2006.01)

(52) U.S. Cl. ............... 264/1.34; 264/2.6; 427/163.1; 427/372.2; 977/890

(58) Field of Classification Search .......... 264/1.1, 264/1.31, 1.34, 2.6, 212, 217, 234; 977/762, 977/890; 427/162, 384, 163.1, 372.2
See application file for complete search history.

(56) References Cited

U.S. PATENT DOCUMENTS

| 5,629,055 | A | 5/1997 | Revol et al. | |
|---|---|---|---|---|
| 5,871,834 | A | 2/1999 | Wang | |
| 8,309,992 | B2 * | 11/2012 | Toguchi et al. | 257/213 |
| 2005/0267345 | A1 | 12/2005 | Korgel et al. | |
| 2007/0074316 | A1 * | 3/2007 | Alden et al. | 977/762 |
| 2007/0102110 | A1 | 5/2007 | Yuba et al. | |
| 2007/0128707 | A1 | 6/2007 | Rorrer et al. | |
| 2008/0023137 | A1 | 1/2008 | Jiang et al. | |
| 2008/0251581 | A1 | 10/2008 | Faenza | |

OTHER PUBLICATIONS

"In vitro chiral nematic ordering of chitin crystallites" by J.F. Revol et al, Int. J. Biol. Macromol, 1993, vol. 15, December, pp. 329 to 335.
French, A.D.; Bertonière, N.R.; Battista, O.A.; Cuculo, J.A.; Gray, D.G., "Cellulose", in *Kirk-Othmer Encyclopedia of Chemical Technology*, 4th ed. New York: John Wiley & Sons, 1993.
Sarko, A.; Marchessault, R.H. *J. Polym. Sci., Part C: Polym. Symp.* 1969, 28, 317-331.
Mark, H. *J. Phys. Chem.* 1940, 44, 764-787.
Earl, W.L.; VanderHart, D.L. *Macromolecules* 1981, 14, 570-574.
Fink, H.P.; Philipp, B.; Paul, D.; Serimaa, R.; Paakkari, T. *Polymer* 1987, 28, 1265-1270.
Battista, O.A.; Coppick, S.; Howsmon, J.A.; Morehead, F.F.; Sisson, W.A. *Ind. Eng. Chem.* 1956, 48, 333-335.
Marchessault, R.H.; Morehead, F.F.; Koch, M.J. *J. Colloid Sci.* 1961, 16, 327-344.
Grunert, M.; Winter, W.T. *J. Polym. Environ.* 2002, 10, 27-30.
Favier, V.; Chanzy, H.; Cavaillé, J.Y. *Macromolecules* 1995, 28, 6365-6367.
Rånby, B.G. *Discuss. Faraday Soc.* 1951, 11, 158-164.

(Continued)

*Primary Examiner* — Mathieu D. Vargot
(74) *Attorney, Agent, or Firm* — Norton Rose Canada LLP

(57) ABSTRACT

A new method to produce solid nanocrystalline cellulose (NCC) films containing patterns by differential heating of aqueous suspensions of NCC has been discovered. When acid-form NCC suspensions are dried by heating to temperatures above 50° C., darkening of the NCC can occur, while neutral forms of NCC can produce iridescent chiral nematic films by heating to temperatures up to 105° C. Placing materials of different thermal conductivity beneath the container containing an evaporating NCC suspension results in watermark-like patterns of different iridescent color imprinted within the film structure. Other colloidal rod-like particles can be employed in place of nanocrystalline cellulose (NCC), for example chitin or chitosan.

12 Claims, 5 Drawing Sheets

OTHER PUBLICATIONS

Marchessault, R.H.; Morehead, F.F.; Walter, N.M. *Nature* 1959, 184, 632-633.
Revol, J.-F.; Bradford, H.; Giasson, J.; Marchessault, R.H.; Gray, D.G. *Int. J. Biol. Macromol.* 1992, 14, 170-172.
Dong, X.M.; Kimura, T.; Revol, J.-F.; Gray, D.G. *Langmuir* 1996, 12, 2076-2082.
Dong, X.M.; Revol, J.-F.; Gray, D.G. *Cellulose* 1998, 5, 19-32.
Araki, J.; Wada, M.; Kuga, S.; Okano, T. *Colloids Surf., A* 1998, 142, 75-82.
Onsager, L. *Ann. N.Y. Acad. Sci.* 1949, 51, 627-659.
Hermans, J. *J. Polym. Sci., Part C: Polym. Symp.* 1963, 2, 129-144.
Beck, S.C. *Phase Separation Phenomena in Cellulose Nanocrystal Suspensions Containing Dextran-Dye Derivatives.* Ph.D. Thesis, McGill University: Montréal, 2007.
de Gennes, P.G. *The Physics of Liquid Crystals.* Oxford: Clarendon Press, 1974.
Revol, J.-F.; Godbout, L.; Gray, D.G. *J. Pulp Pap. Sci.* 1998, 24, 146-149.
de Vries, HI. *Acta. Cryst.* 1951, 4, 219-226.
Roman, M.; Gray, D.G. *Langmuir* 2005, 21, 5555-5561.
Edgar, C.D.; Gray, D.G. *Cellulose* 2001, 8, 5-12.
Bondeson, D.; Mathew, A.; Oksman, K. *Cellulose* 2006, 13, 171-180.
Cranston, E.D.; Gray, D.G. *Biomacromolecules* 2006, 7, 2522-2530.
Wågberg, L.; Decher, G.; Norgren, M.; Lindström, T.; Ankerfors, M.; Axnäs, K. *Langmuir* 2008, 24, 784-795.
Dong, X.M.; Gray, D.G. *Langmuir* 1997, 13, 2404-2409.
Edgar, C.D.; Gray, D.G. *Cellulose* 2003, 10, 299-306.
Lefebvre, J.; Gray, D.G. *Cellulose* 2005, 12, 127-134.
Isogai, A.; Kato, Y. *Cellulose* 1998, 5, 153-164.
Araki, J.; Wada, M.; Kuga, S.; Okano, T. *J. Wood Sci.* 1999, 45, 258-261.
Araki, J.; Wada, M.; Kuga, S. *Langmuir* 2001, 17, 21-27.
Revol, J.-F.; Marchessault, R.H. *Int. J. Biol. Macromol.* 1993, 15, 329-335.
Murray, S.B.; Neville, A.C. *Int. J. Biol. Macromol.* 1998, 22, 137-144.
Dogic, Z.; Fraden, S. *Langmuir* 2000, 16, 7820-7824.

* cited by examiner

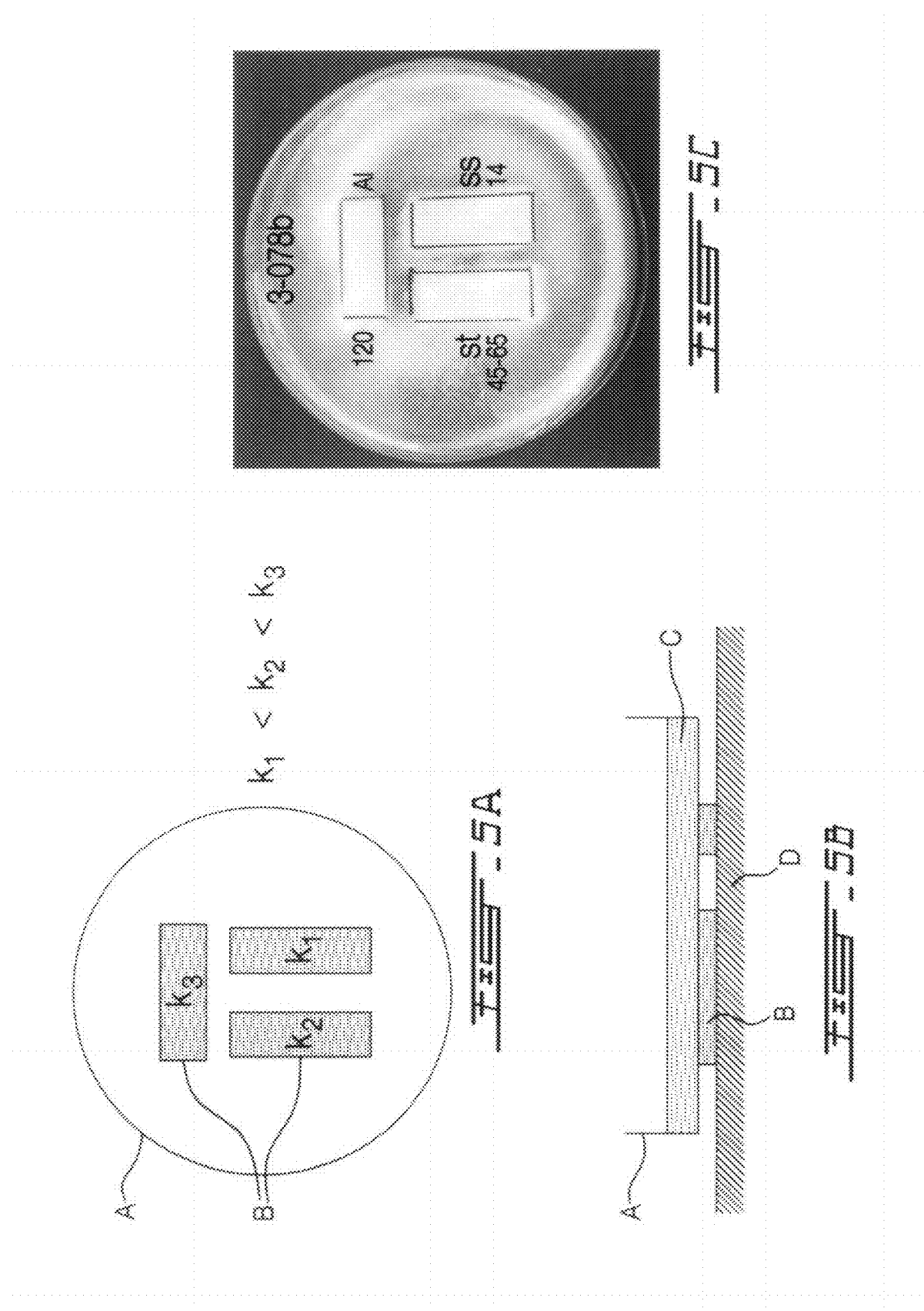

METHOD FOR PRODUCING IRIDESCENT SOLID NANOCRYSTALLINE CELLULOSE FILMS INCORPORATING PATTERNS

CROSS-REFERENCE TO RELATED APPLICATION

This application is related to U.S. Provisional Application 61/193,619 filed Dec. 11, 2008 and the benefit under 35 USC 119(e) of such US Provisional Application is claimed.

BACKGROUND OF THE INVENTION i) Field of the Invention

The present invention relates to a method of producing nanocrystalline cellulose (NCC) films by moderate heating of NCC suspensions and to producing patterns incorporated into the structure of the NCC films by controlling transfer of heat to the suspensions by means of materials having thermal properties different from those of the heating environment. The invention also relates to iridescent solid nanocrystalline cellulose films incorporating patterns.

ii) Description of the Prior Art

Cellulose is the most abundant organic compound on earth. It is the structural component of the primary cell wall of higher plants and green algae, and it is also formed by bacteria, some fungi, and tunicates (invertebrate marine animals) [1].

Native cellulose has a hierarchical structure, from the polymeric glucose chains to the microfibrils which make up the cell walls of plants. The cellulose polymer chain is derived from D-glucose units, which condense through β(1→4)-glycosidic bonds giving a rigid straight chain having many inter- and intramolecular hydrogen bonds among the many glucosidic hydroxyl groups. These features allow the cellulose chains to pack closely to give areas of high crystallinity within the microfibril [2]. Cellulose microfibrils also contain amorphous regions randomly distributed along their length [3-5].

Cellulose whiskers or nanocrystals are obtainable by controlled acid hydrolysis of the cellulose sources listed above, in particular from wood pulp and cotton. The less-dense amorphous regions along the cellulose microfibril are more susceptible to acid attack during hydrolysis and cleave to give cellulose nanocrystals [6,7]. Their low cost, renewability and recyclability, and their chemical reactivity allowing their chemical and physical properties to be tailored make nanocrystalline cellulose whiskers attractive for various applications [8,9].

Nanocrystalline cellulose (NCC) is rodlike in shape with an aspect ratio which varies from 1 to 100 depending on the cellulose source. Wood cellulose nanocrystals average 180-200 nm in length with a cross section of 3-5 nm [9]. Nanocrystal dimensions also depend to a certain extent on the hydrolysis conditions used to obtain them.

The stability of NCC suspensions derives from sulfate ester groups imparted to the cellulose nanocrystal surfaces during hydrolysis with sulfuric acid. The NCC particles are therefore negatively charged in aqueous media and are thus electrostatically stabilized [7, 10-14]. Hydrochloric acid has also been used to produce NCC, but does not introduce charged surface groups [15].

The anisometric rod-like shape and negative surface charge of NCC particles result in suspensions which phase separate into an upper random phase and a lower ordered phase, at concentrations above a critical concentration, as described theoretically by Onsager [16]. The ordered phase is in fact a liquid crystal; liquid crystalline behaviour of cellulose suspensions was first reported by Rånby in 1951 [10]. Marchessault et al. and Hermans demonstrated that such suspensions displayed nematic liquid crystalline order [11,17]. In 1992, Revol and co-workers showed that the suspensions in fact formed a cholesteric, or chiral nematic, liquid crystalline phase [12].

As shown in FIG. 1A, between two critical concentrations, an NCC suspension will separate into two phases [16]. This region spans a range of approximately 1-15% (w/w) for cellulose nanocrystals, depending on the cellulose source. As the NCC concentration increases, the volume fraction of liquid crystalline phase increases until the suspension becomes completely chiral nematic above the upper critical concentration. As shown in FIG. 1B, chiral nematic liquid crystals contain rods arranged in pseudo-layers [18,19]. The rods are aligned parallel to each other and to the plane of the layer, each layer being rotated slightly with respect to the layers above and below it, thereby producing a helix composed of the pseudo-layers. The pitch P of the helix is defined as the distance required for the NCC particles to make one full rotation about a line perpendicular to the layers.

As disclosed in U.S. Pat. No. 5,629,055, aqueous NCC suspensions can be slowly evaporated to produce solid semi-translucent NCC films that retain the chiral nematic liquid crystalline order which forms above the critical concentration and increases in volume fraction as the water continues to evaporate [20,21]. These films exhibit iridescence by reflecting left-handed circularly polarized light in a narrow wavelength band determined by the chiral nematic pitch and the refractive index of the film (1.55) according to Equation 1:

$$\lambda = nP \sin\theta \quad (1)$$

where λ is the reflected wavelength, n is the refractive index, P is the chiral nematic pitch, and θ is the angle of reflection relative to the surface of the film [21]. The wavelength reflected thus becomes shorter at oblique viewing angles. This reflectance was explained by de Vries [22] on the basis of Bragg reflections in a helicoidal arrangement of birefringent layers, as is the case for cellulose nanocrystals in a chiral nematic liquid crystal. When the pitch of the helix is on the order of the wavelengths of visible light (around 400 to 700 nm), the iridescence will be coloured and will change with the angle of reflection. It has been found that the iridescence wavelength can be shifted toward the ultraviolet region of the electromagnetic spectrum by increasing the electrolyte concentration (e.g., NaCl or KCl) in the NCC suspension prior to film formation [21]. The additional electrolyte partially screens the negative charges of the sulfate ester groups on the NCC surfaces, reducing the electrostatic repulsion. The rod-like particles therefore approach each other more closely, which reduces the chiral nematic pitch of the liquid crystal phase and therefore shifts the film iridescence to shorter wavelengths. This method of "blue-shifting" NCC film iridescence is limited by the amount of salt which can be added before the suspension is destabilized by too much screening and gelation occurs [13,21].

The NCC film iridescence colours observed by Revol et al. (1998) also depended on the cellulose source and the hydrolysis conditions (e.g., reaction time and ground cellulose particle size). Smaller NCC particles yield films with a smaller pitch. Desulfation by heating the suspensions prior to forming the films was also found to reduce the chiral nematic pitch [21].

The microstructure of solid NCC films depends on the drying conditions [23]. Suspensions evaporated at ambient conditions generally produce films with polydomain structures in which the helical axes of different chiral nematic domains point in different directions. Drying NCC suspensions in a strong (2 to 7 T) magnetic field will align the axes to produce a more uniform texture, increasing the intensity of the iridescence without changing the wavelength [21,24].

In the laboratory-scale procedure for producing NCC, sonication is used as a final step following acid removal by dialysis, in order to disperse the particles to obtain a colloidal suspension [13,24]. The effects of sonication on NCC suspension properties have been studied by Dong et al. [14]. They found that brief sonication was sufficient to disperse the cellulose particles and further sonication was counterproductive. A more recent study corroborates this observation [25]. Sonication is thought to break up side-by-side NCC aggregates in suspension [7].

Films of NCC have also been prepared on substrates such as silicon [26]. These films are much thinner than the solid NCC films and are composed of alternating layers of NCC and a cationic polymer (poly(allylamine hydrochloride)). Above a certain thickness, the films exhibit colours that change with increasing thickness, but these colours are due to destructive interference between light reflected from the air-film interface and from the film-substrate interface [26]. Interference colours have also been seen in polyelectrolyte multilayers of microfibrillated cellulose [27].

The sulfate ester groups are associated with $H^+$ counterions from the acid hydrolysis, which can be neutralized with a range of bases (MOH) to give salt forms of NCC, (M-NCC) with neutral counterions other than $H^+$, such as alkali metals and in particular $Na^+$, $K^+$ or $Li^+$, or organic phosphonium ($R_4P^+$) and organic ammonium ions ($R_4N^+$), where each R group which may be the same or different from the other R groups, is an organic chain or group, for example a phenyl group or an alkyl chain of 1 or more, preferably 1 to 4, carbon atoms (e.g., tetraethylammonium ion, $(C_2H_5)_4N^+$) [28]. The acidic NCC is designated H—NCC, while the neutral sodium form of NCC is designated Na—NCC. Thermal treatment, both gentle and harsh, has been used to stabilize NCC films, dried by evaporation, against redispersal in water: heating at 35° C. for 24 h in a vacuum oven is sufficient for solid H—NCC films evaporated at ambient conditions [28], although heating overnight at 105° C. [29] and at 80° C. for 15 min [30] have also been used to stabilize spin-coated H—NCC films. NCC films containing $Na^+$ counterions have been stabilized at 80° C. for 16 h [20]; as well as at 105° C. for times between 2 and 12 h.

Prior to the present invention, there has been no method to produce films of NCC containing patterns incorporated into the film structure.

SUMMARY OF THE INVENTION

It is an object of the present invention to provide a method for producing colloidal rod-like particle films, for example NCC films, with designs incorporated directly into the film structure without the need for additives.

It is another object of the invention to provide iridescent solid films of colloidal rod-like particles, for example nanocrystalline cellulose films, incorporating patterns.

The invention is particularly described hereinafter by reference to the embodiment in which the colloidal rod-like particles are nanocrystalline cellulose particles, it being understood that the inventions herein extend to colloidal rod-like particles generally, and are not confined to nanocrystalline cellulose which represents a preferred embodiment of the invention.

In accordance with one aspect of the invention there is provided a method of producing an iridescent solid film comprising an electrostatically charged nanocrystalline cellulose (NCC) having an iridescent pattern therein, comprising: disposing a pattern-defining member in a heat transfer zone between an aqueous suspension of an electrostatically charged NCC and a source of heat, and evaporating water from said suspension with heat from said source to form a solid film comprising said NCC, said pattern-defining member having a heat transfer rate for transfer of heat from said source to said suspension, different from the heat transfer rate of said heat transfer zone.

The heat transfer rate for transfer of heat from the source to the suspension may be greater than or less than the heat transfer rate of the heat transfer zone. Preferably the heat transfer rate for transfer of heat from the source to the suspension is greater than the heat transfer rate of the heat transfer zone.

In accordance with another aspect of the invention there is provided a method of producing an iridescent solid film comprising an electrostatically charged nanocrystalline cellulose (NCC) having an iridescent pattern therein, comprising: subjecting an aqueous suspension of an electrostatically charged NCC to heat to evaporate water from said suspension with formation of a solid film comprising said NCC, wherein exposure of the suspension to the heat is controlled so that the solid film is formed with film zones therein having been subjected to different levels of heat transfer whereby said zones define the pattern.

In accordance with still another aspect of the invention there is provided an iridescent solid film comprising an electrostatically charged nanocrystalline cellulose (NCC) having an iridescent pattern of NCC therein, said film being of a non-homogeneous structure in which zones of NCC forming the pattern differ structurally from zones of NCC surrounding said pattern.

In accordance with yet another aspect of the invention there is provided a security or identification device incorporating a solid film of the invention.

In still another aspect of the invention there is provided use of the solid film of the invention in an optical authenticating device.

BRIEF DESCRIPTION OF THE DRAWINGS

FIG. 5A is a schematic illustration of the disposition of different thermal conductors used to make a pattern in an NCC film.

FIG. 5B is a schematic illustration of the formation of an NCC film heated in a container in contact with thermal conductors above a heat source.

FIG. 5C shows an NCC film produced by the assembly described in FIGS. 5A and 5B.

DETAILED DESCRIPTION OF THE INVENTION

Figure 1B:
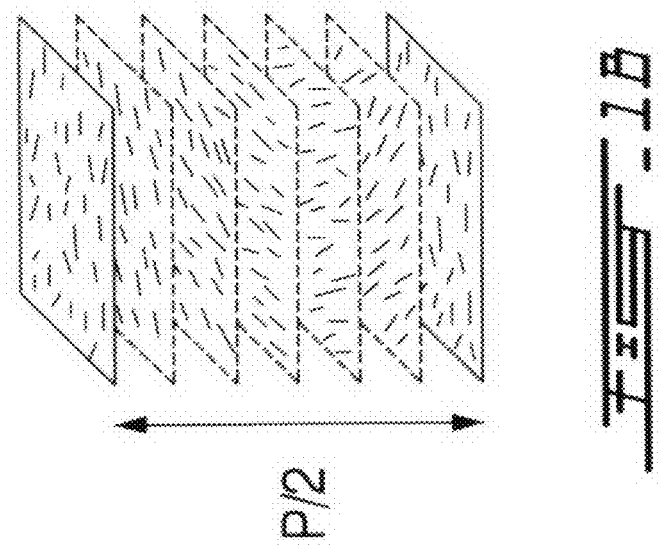
FIG. 1B shows a schematic view of the arrangement of NCC particles in the chiral nematic phase. Distance indicated is half the chiral nematic pitch P.

NCC is produced by controlled acid hydrolysis of cellulose from various sources including bleached wood pulp [6,7,14]. Typically, ground bleached wood pulp is hydrolyzed with 64% (w/w) sulfuric acid with heating at 45° C. for 25 minutes. The reaction mixture is diluted with water to arrest the hydrolysis and excess acid is removed from the NCC by decantation, centrifugation/washing and dialysis. Well-dispersed colloidal suspensions of NCC are obtained by separating the individual NCC particles by a disruptive treatment such as sonication. The stability of the NCC suspensions derives from anionic sulfate ester groups imparted to the cellulose nanocrystal surfaces during hydrolysis. Hydrochloric acid hydrolysis of cellulose in an analogous manner will also produce NCC; however, the NCC particles are electrostatically neutral (without anionic groups attached) and do not form stable aqueous colloidal suspensions [31]. Post-sulfation by sulfuric acid treatment [32] or TEMPO-mediated oxidation by NaOCl (for example) to convert cellulose hydroxyls to carboxylate moieties [33] can be used to impart negatively charged groups to this HCl-produced NCC.

The solid NCC films of this invention may be employed as optical authenticating devices or for decorative purposes. Thus a film of the invention may be cast on a substrate which carries data, for example, paper of value, an identity card or a credit card, to protect against attempted forgery using color copiers. The solid film may also be employed as cast, i.e. without a substrate for such optical authenticating devices, for example, in security or identification devices, for example identification cards; or as anti-counterfeiting papers.

The term "iridescence" as used herein means a phenomenon in which the wavelength of reflection changes with the angle from which a surface is viewed, according to Equation 1.

The term "heat" as used herein means any means of heating an object, for example by conduction, convection, radiation, microwave heating, heating with a laser, etc.

In a simple form the method of the invention comprises a step of heating an NCC suspension in a container placed on a material of different thermal properties from the surrounding heat transfer media or adjacent heat transfer environment.

The nanocrystalline cellulose employed in the invention is, in particular, derived from cellulose bearing anionic groups, which groups may be associated with cations. In particular, the anionic groups may be sulfate ester groups resulting from hydrolyzing of cellulose with sulfuric acid. The cations may, in particular, be alkali metal ions, such as sodium ion or potassium ion.

In the method of the invention, the aqueous suspension is typically spaced from a source of heat whereby a heat transfer zone is disposed between the suspension and the source of heat. This heat transfer zone may typically be air. Suitably, the suspension itself is in the form of a thin liquid layer. Applying heat in this way from the heat source through the heat transfer zone would typically result in a relatively uniform transfer of heat from the source to the suspension. In the invention, however, the transfer of heat through the heat transfer zone is controlled so that some parts of the suspension are exposed to a higher rate of heat transfer from the heat source than adjacent parts. With the evaporation of water from the suspension, there is thereby formed a film in which the parts of the suspension exposed to the higher rate of heat transfer form a heat-treated zone in the resulting solid film which differs structurally from adjacent zones of the film not subjected to the higher rate of heat transfer. In accordance with the invention, the control is such that the structurally different zones define a pattern, and the structural differences between the zones results in the differences in iridescence wavelength.

In general, in order to ensure the formation of a chiral nematic phase, or of chiral nematic organization within the suspension as it is dried, and so that the film exhibits iridescence, an evaporation time typically of 4 to 6 hours is found to be suitable. Such an evaporation time of duration permits adequate phase separation in the suspension samples.

The heat transfer rate of the heating zone is suitably one sufficient to permit evaporation of water from the suspension with formation of the required solid film. In particular, the evaporation time is suitably one sufficient to permit the self-assembly of the NCC particles into a chiral nematic organization; a typical suitable range of time for the evaporation is 4 to 6 hours.

The solid film is thus of a non-homogeneous structure, zones forming the pattern differing structurally from zones adjacent or surrounding the pattern.

In particular, the zones exposed to the higher rate of heat transfer are comprised of more loosely packed NCC than the zones exposed to the lower rate of heat transfer.

Typically, the control also results in the film being of variable thickness, the film being thicker in the zones exposed to the higher rate of heat transfer than the adjacent or surrounding zones exposed to the lower rate of heat transfer.

It will be understood that typically there will be boundary regions between the zones exposed to the higher rate of heat transfer and the zones subjected to the lower rate of heat transfer, and these regions may exhibit a structure intermediate that of the zones exposed to the higher rate of heat transfer and the zones exposed to the lower rate of heat transfer. These intermediate regions are also typically of an intermediate thickness.

Typically, the control of heat transfer may be by interposing in the heat zone, between the aqueous suspension and the heat source, a pattern-defining member which will exhibit greater heat transfer characteristics than the heat transfer zone. Typically, the pattern-defining member may be a metal member of high heat conductivity, the member being shaped to define the desired pattern. The member may also be of a generally sheet form with material removed to define an open pattern therethrough. In this case, the pattern in the solid film will be formed by a zone subjected to a lower heat transfer rate than the surrounding area; and it will be the surrounding adjacent zones of the film which will have been subjected to the higher heat transfer rate.

The heat transfer rate of the heating zone must be sufficient to permit evaporation of water from the suspension with formation of the solid film. The pattern-defining member needs to provide a heat transfer rate sufficiently different from the heat transfer rate of the heating zone to provide the desired non-homogeneous structure in the solid film, resulting in the zones of NCC forming the pattern, differing structurally from the zones of NCC surrounding or adjacent the pattern. Very faint patterns result when the film is formed over the pattern-defining member (thermal conductor) at room temperature; a minimum temperature of around 30° C. is required for the formation of a distinct pattern. Very faint patterns also result when the pattern-defining member is a thermal insulator such as PVC and the film is formed in an oven at 60° C.

The rate of evaporation of water and the rate of solid film formation will depend on different factors, and in particular, the temperature to which the suspension is exposed. In general, the suspension will be exposed to a temperature of 30 to 105° C. to achieve the evaporation and solid film formation.

The solid film produced may be a solid film of the NCC, or may be a plasticized film of NCC achieved by including a plasticizer such as polyvinyl alcohol in the suspension.

It has been found that in order to produce a pattern in the resulting NCC film, the pattern-forming member is most suitably in contact with a thermal conductor which is itself more or less in contact with the heat source. That is, a thermal conductor (e.g., metal plate) in contact with the suspension container (e.g., Petri dish bottom) but otherwise surrounded by an insulating medium such as air or plastic (e.g., the Petri dish is raised above the metal shelf of the oven) will not produce a pattern in the resulting NCC film.

In the examples of the invention, the iridescent chiral nematic films are produced from colloidal rod-like particles of nanocrystalline cellulose (NCC). However, as indicated hereinbefore, the invention does not apply to NCC films solely. Any other rod-like particles of appropriate colloidal dimensions which, when suspended in a liquid, self-assemble into chiral nematic liquid crystalline ordered phases above a critical concentration, will produce a solidified liquid crystal film comprising the rod-like particles arranged in the chiral nematic fashion when the liquid is evaporated. Provided the chiral nematic pitch of said film is of the correct dimensions (approximately 100 nm to 1 µm), the film will be iridescent with a reflection wavelength in the visible region of the electromagnetic spectrum. Thus, a red-shifted pattern could be produced in the film according to the method described in the current invention. Examples of other rod-like particles which form chiral nematic liquid crystal phases in suspension include: chitin [34,35], chitosan [35], and the fd bacteriophage virus [36]. Colloidal dimensions herein with reference to the rod-like particles refers to rod-like particles in which at least one dimension is in the range 1 to 1000 nm. For convenience the invention is more particularly described by reference to the embodiment in which the rod-like particles are of nanocrystalline cellulose (NCC).

Mechanism of pattern formation: A red-shifted pattern is produced when the pattern-defining object has higher thermal conductivity than the surrounding area and a blue-shifted pattern is produced when the pattern area has lower thermal conductivity than the surrounding area, indicating that the increased evaporation rates in the pattern area are the cause of the red-shift in the first case. It is also found that a localized difference in heat transfer rate, such as that at the edges of a metal pattern, enhances the colour difference observed between the areas above the metal pattern and the surrounding film (results not shown; red-shifted over the metal pattern compared to the surrounding film), indicating that thermal turbulence is increased in these areas, causing the red-shifted pattern. Both evaporation and thermal turbulence mechanisms may contribute to thermal pattern formation in NCC films.

The film-casting temperature and the relative thermal conductivities of the pattern-forming object and the surrounding heat transfer medium must be sufficient to produce an adequate difference in heat transfer rates, to form the different zones having the different structure, whereby the pattern is formed in the NCC film. A minimum relative heat transfer rate appears to be required; a difference in thermal conductivity as low as 0.2 W/m·K (the difference between PVC and air) has been found to create faint patterns of different iridescence wavelength in NCC films. However, a thermal conductor (e.g. metal) in combination with a thermal insulator (e.g. air) appears to give the best results.

DETAILED DESCRIPTION OF THE INVENTION WITH REFERENCE TO THE DRAWINGS

Figure 1A:
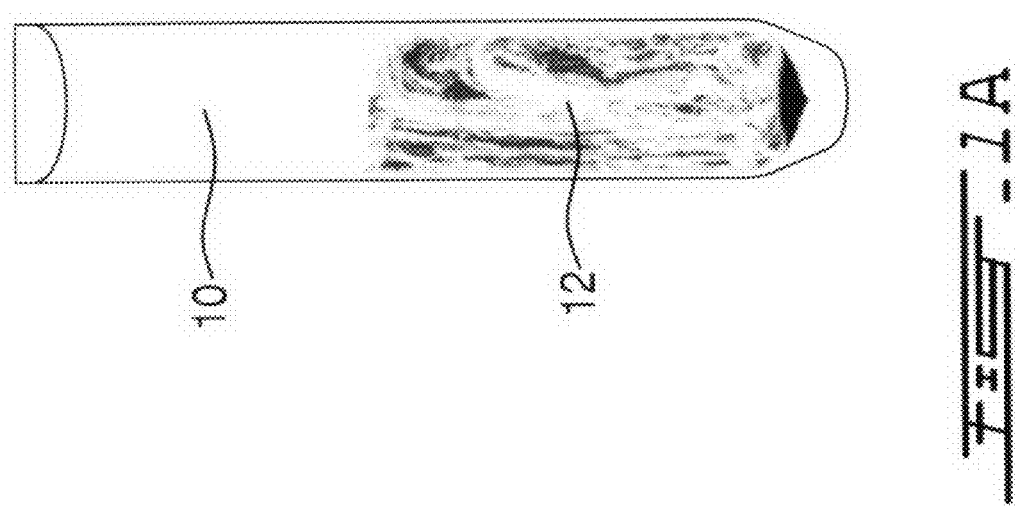
FIG. 1A shows a biphasic NCC suspension (isotropic phase 10 above and chiral nematic phase 12 below) in a flat tube viewed between crossed polarizers.

Aqueous suspensions of electrostatically charged NCC produced by sulfuric acid hydrolysis can be evaporated to produce solid semi-translucent NCC films that retain the chiral nematic liquid crystalline order inherent to these NCC suspensions above a critical concentration (see FIG. 1A) [21]. These films exhibit iridescence by reflecting circularly polarized light in a narrow wavelength band determined by the chiral nematic pitch and the refractive index of the film according to Equation 1:

$$\lambda = nP \sin \theta \tag{1}$$

where $\lambda$ is the reflected wavelength, n is the refractive index, P is the chiral nematic pitch (see FIG. 1B), and $\theta$ is the angle of reflection relative to the film surface.

Acid-form NCC suspensions (in which the counterion associated with the covalently-bound surface sulfate ester groups is $H^+$) are sensitive to heat. At temperatures above 40-45° C., the nanocrystals undergo slow desulfation with consequent loss of surface charge density [28]; at temperatures of 70-75° C., dried H—NCC suspensions darken (brown) slightly within a few hours, while at 105° C., dried H—NCC suspensions darken and char within 5 minutes. In contrast, NCC suspensions with monovalent cations other than $H^+$ (such as Na—NCC) produce films which are unaltered even after 24 hours at 105° C. For this reason, it is recommended that the use of H—NCC suspensions to make films be restricted to temperatures below 50° C., while films of other neutral forms of NCC such as Na—NCC may be produced at temperatures above 50° C.

H—NCC suspensions form films without charring when dried at temperatures ranging from 30-50° C.; however, it is not known whether the physical or mechanical properties of these films differ from those produced at ambient conditions, owing to the possibility of desulfation and residual acid-catalyzed hydrolysis of cellulose within the film.

The NCC film iridescence in the IR, visible and UV regions of the spectrum can be fine-tuned by controlling the electrolyte (e.g., NaCl) concentration in the NCC suspension, which reduces the chiral nematic pitch and hence shifts the iridescence towards shorter wavelengths [20,21]. No method has been reported in the literature to change the iridescence wavelength without the use of additives, nor has a method been reported which shifts the iridescence towards longer wavelengths.

Figure 2A:
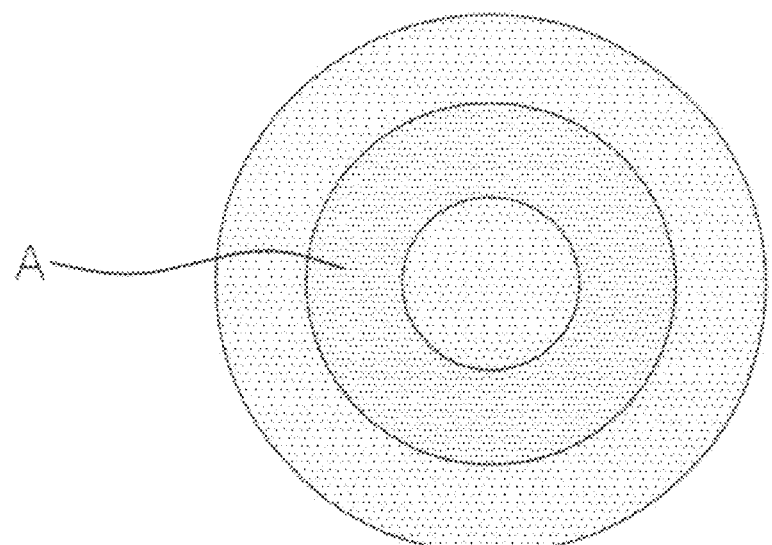
FIG. 2A and FIG. 2B are schematic illustrations of the formation of an NCC film heated over a thermal conductor in contact with a heat source.
Figure 2B:
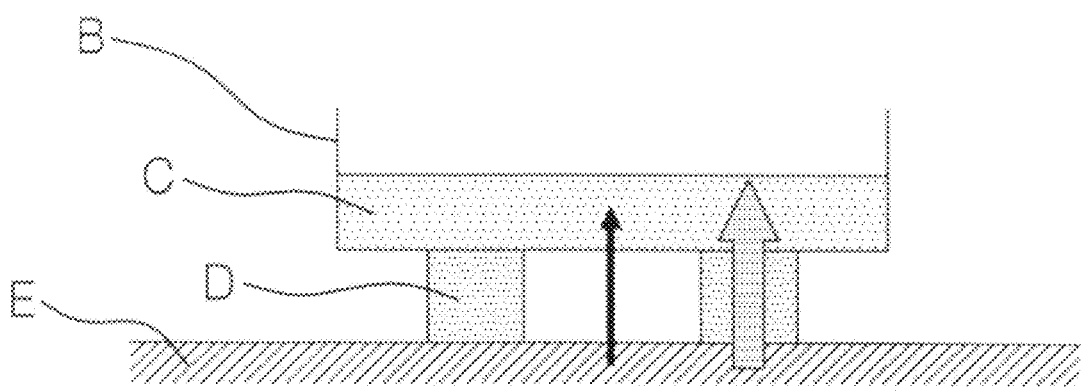

According to the present invention, NCC suspensions, when evaporated by heating at temperatures ranging from 30-105° C. with a portion of the container (typically a polystyrene Petri dish) in contact with a material of different thermal properties (e.g., higher thermal conductivity/heat capacity) than the surrounding material, produce a solid NCC film having a discernible pattern in the shape of the material. The pattern is almost identical in dimensions to the thermal conductor and is of a longer wavelength of reflection than (i.e., red-shifted in colour compared to) the surrounding film, meaning that the self-assembling chiral nematic structure has packed more loosely where the heat transfer was faster (and therefore solvent evaporation was faster and thermal turbulence was greater), providing a longer pitch and consequently reflecting longer wavelengths of light. The temperature in the suspension directly above the thermal conductor (e.g., a metal) will be higher than that in the surrounding suspension, owing to the fact that heat will be transferred to the suspension at a greater rate by the thermal conductor (see FIG. 22A and FIG. 2B) The side view in FIG. 2B shows the NCC suspension C in the container B on top of a thermal conductor D in the shape of a ring. The whole assembly is on a shelf in an oven or a thermostatted hot plate, E. Higher temperature areas A, shown in the top view, in the suspension lead to a red-shift of the resulting film iridescence compared to the surrounding areas. The arrows indicate the relative rates of heat transfer to the suspension. As shown in FIG. 2B, the pattern-defining member needs to be in some form of "thermal contact" with the heating source or a thermal conductor; if it is surrounded by a good insulating medium (e.g., air, plastic), no pattern is produced in the resulting NCC films.

While not wishing to be bound by any particular theory, it is believed that two distinct, although perhaps complementary, mechanisms are at play in the development of thermal patterns during NCC film casting.

A first mechanism depends on the relative rates of water evaporation of the different zones of suspension. The water in the suspension above the thermally conductive pattern-defining component will evaporate more quickly due to the higher rate of heat transfer to which it is exposed. This in turn may cause those areas of suspension to attain a viscosity at which the NCC particles are no longer mobile, while the NCC particles are at a greater separation (i.e., sooner) than they are in the surrounding suspension, causing a more loosely packed structure with a larger pitch (longer iridescence wavelength) to be retained in those areas.

A second mechanism of pattern formation depends on the difference in heat transfer rates between the areas of suspension above the pattern-defining component and the surrounding suspension, which may create a "thermal turbulence" of the NCC particles, similar to Brownian motion. The thermally-induced motion of the NCC particles will be greater in the areas of faster heat transfer, leading to a more loosely packed structure with a larger pitch in those areas upon drying.

A narrow thermal conductor (e.g., a wire) induces a pattern red-shifted relative to the rest of the film, while a narrow insulating gap (air) between two identical metal plates produces a blue-shifted pattern, indicative of the evaporation rate mechanism. Furthermore it is found that a localized difference in heat transfer rate, such as that at the edges of a metal pattern, enhances the colour difference observed between the areas above the metal pattern and the surrounding film, indicative of higher thermal turbulence in these areas, and thus the thermal turbulence mechanism.

It is probable that both mechanisms may contribute to thermal pattern formation in NCC films. Initially, the dilute NCC suspension is isotropic, with the rods randomly oriented and at random distances from each other. Heat transfer to the suspension will increase the random thermal motion of the particles. The formation of NCC films under heating may then be envisaged as follows:

When the NCC concentration exceeds c*, tactoids or small domains of chiral nematic texture begin forming. The thermal turbulence or thermal motion of the NCC particles induced by the different rates of heat transfer will act to increase the average interparticle separation and result in a larger chiral nematic pitch in areas of greater thermal motion.

At concentrations above c* and approaching the concentration $c_{gel}$, when the NCC particles are close enough to each other that they begin to be entangled (i.e., close to gelation and solid film formation, at which point the NCC particle separation becomes fixed), the evaporation rate will determine the final fixed interparticle separation: In areas of faster heat transfer and therefore faster evaporation, $c_{gel}$ will be reached before the NCC particles can approach a final minimum equilibrium separation or pitch, "locking in" the chiral nematic texture. The pitch will thus be larger than in areas of slower evaporation in which the NCC particles have more time to approach more closely a minimum separation (i.e., a smaller pitch). The evaporation rate is thus more important than thermal turbulence in controlling the final chiral nematic pitch in the NCC film.

The present invention is illustrated by, but not limited to, the following examples:

General Procedure: Preparation of Patterned NCC Films by Heating

An NCC suspension (1-8% (w/w), preferably 2-4% (w/w)) is sonicated (generally between 0-5000 J/g NCC) or treated with high-shear mechanical forces and then placed in a container (e.g., a polystyrene Petri dish) on top of a metal object and heated in an oven at an elevated temperature (30-105° C., preferably 45-60° C.) until a solid NCC film is obtained.

H—NCC and Na—NCC (and therefore by extension NCC with other monovalent counterions [28]), as well as NCC oxidized by TEMPO-mediated oxidation with NaOCl, NCC suspensions containing from 2-12% poly(vinyl alcohol) (w/w) as plasticizer, and NCC suspensions treated with a high-pressure shear homogenizer all produce patterns when treated in the manner described above.

Example 1

Patterned NCC Film Displaying Logo

Figure 3B:
FIG. 3B shows a film produced from an Na—NCC suspension previously sonicated and containing poly(vinyl alcohol), evaporated by heating over the wire shown in FIG. 3A. Scale bar, 1.3 cm.
Figure 3A:
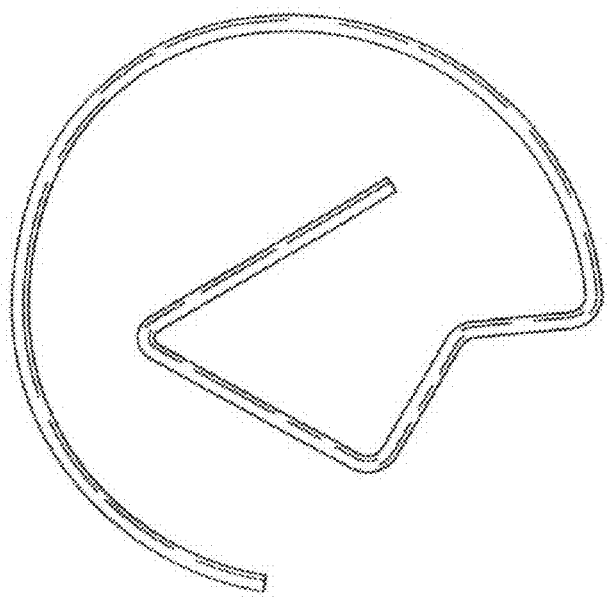
FIG. 3A shows a metal wire, bent in the shape of the FPInnovations logo, used to produce the pattern in the film shown in FIG. 3B. Scale bar, 2.4 cm.

A 15-mL aliquot of 2.6% (w/w) Na—NCC suspension containing 3.5% poly(vinyl alcohol) (PVA) w/w relative to NCC, was sonicated to 600 J (1540 J/g NCC). A film was created by heating the suspension to 60° C. in a 9-cm diameter polystyrene Petri dish with a metal wire 2.4 mm in cross-sectional diameter (FIG. 3A) placed underneath. The resulting film displays a distinct pattern (FIG. 3B); the pattern itself is orange-yellow while the surrounding areas are yellow-green to blue. This demonstrates the sensitivity of the method, as the area of direct contact between the wire and the Petri dish is minimal.

Example 2

Thickness of Patterned NCC Films

Figure 4B:
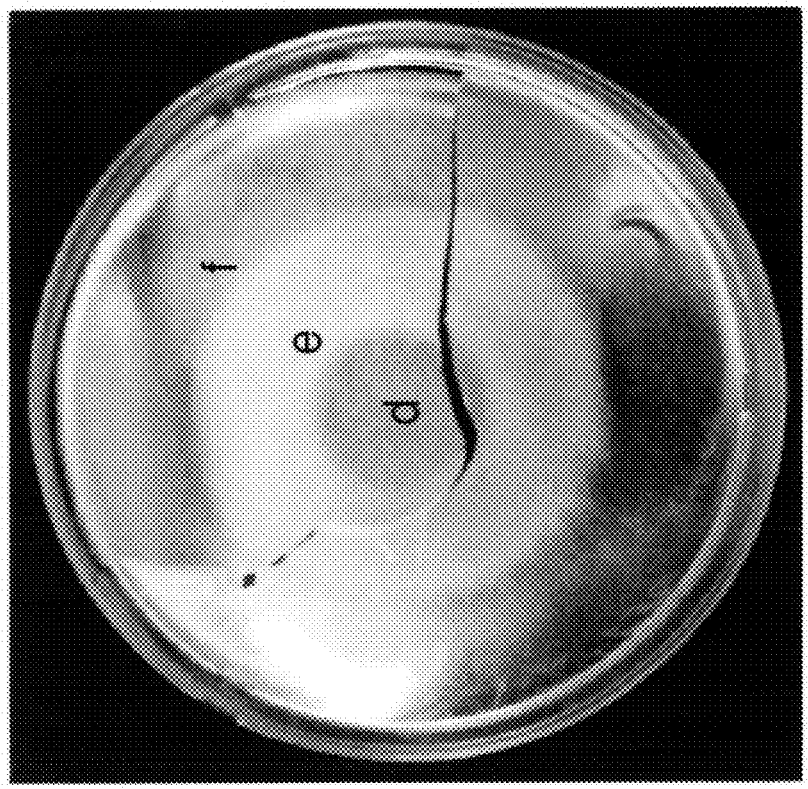
FIG. 4B shows a film produced from an Na—NCC suspension previously sonicated and heated over a steel washer. Scale bar, 2.25 cm.
Figure 4A:
FIG. 4A shows a film produced from an Na—NCC suspension previously sonicated and heated over a steel washer. Scale bar, 2.25 cm.

Films were created by heating 15-mL samples of 2.6% (w/w) Na—NCC suspensions (sonicated between 500 to 800 J) containing 0 to 2.4 to 5% PVA (w/w relative to NCC) at temperatures from 45-60° C. over steel washers. The thickness of different areas of the films was measured with a digital micrometer. The thickness of the differently-coloured areas in the films appears to vary with wavelength of reflection, longer wavelengths corresponding to thicker regions. In FIG. 4A, the average thickness of the center (blue in colour) is 67 μm, while the average thickness of the ring (orange) is 85 μm; locations a, b and c have thicknesses of 67, 101 and 59 μm, respectively. In FIG. 4B, the average thicknesses of the center (blue-green), inner ring (yellow), outer ring (greenish yellow) and the narrow region immediately surrounding the ring (blue) are 69, 82, 74 and 66 μm, respectively; locations d, e and f have thicknesses of 69, 82 and 64 respectively. The differences are most likely due to the varying pitch of the chiral nematic texture in these areas.

Example 3

Colour and Thickness of Films Produced by Heating NCC Suspensions

A temperature differential induced by areas of differing thermal conductivity is not necessary to produce differences in NCC film colour. NCC films produced by heating also show colour shifts towards longer wavelengths when compared to films produced at lower temperatures. For example, a red-shift from 450 nm to 470 nm peak wavelength of reflection (with angles of incidence and reflection of 45 degrees) is observed when an Na—NCC film is produced at 45° C. and 60° C., respectively. A red-shift from 440 to 470 nm is also observed when a film is produced by heating over metal as compared to plastic at 60° C.; the film heated over metal is also measurably thicker than that heated over plastic.

Example 4

Patterned NCC Film Produced on Thermostatted Hot Plate

A 15-mL aliquot of Na—NCC suspension (2.6% NCC (w/w)) was sonicated to 600 J input and placed in a Petri dish on top of a stainless steel disk (3 cm diameter, 1 cm thickness) resting on a thermostatted hotplate set to 50° C. The suspension was allowed to evaporate in the open air. A blue to green film with a distinct yellow to orange circle (~3 cm in diameter) was produced. The texture of the film was not as uniform as that of films produced in an oven.

Example 5

Patterns Produced in NCC Films by Different Thermal Conductors

As shown in FIG. 5A, strips of metal B of equal thickness but having different thermal conductivities were placed in contact with the bottom of a plastic Petri dish A. To the Petri dish A was added 15 mL of 2.6% Na—NCC (w/w) suspension C that had been sonicated to 600 J input. The assembly was placed on top of a metal shelf D in an oven at 55-60° C. as shown in FIG. 5B, until a solid iridescent NCC film formed as shown in FIG. 5C. The NCC film was blue to blue-green with orange-yellow rectangles in the shape of the metal pieces. Under these conditions, the resulting patterns had no discernible differences in wavelength.

REFERENCES

1. French, A. D.; Bertonière, N. R.; Battista, O. A.; Cuculo, J. A.; Gray, D. G., "Cellulose", in *Kirk-Othmer Encyclopedia of Chemical Technology*, 4$^{th}$ ed. New York: John Wiley & Sons, 1993.
2. Sarko, A.; Marchessault, R. H. *J. Polym. Sci., Part C: Polym. Symp.* 1969, 28, 317-331.
3. Mark, H. *J. Phys. Chem.* 1940, 44, 764-787.
4. Earl, W. L.; VanderHart, D. L. *Macromolecules* 1981, 14, 570-574.
5. Fink, H. P.; Philipp, B.; Paul, D.; Serimaa, R.; Paakkari, T. *Polymer* 1987, 28, 1265-1270.
6. Battista, O. A.; Coppick, S.; Howsmon, J. A.; Morehead, F. F.; Sisson, W. A. *Ind. Eng. Chem.* 1956, 48, 333-335.
7. Marchessault, R. H.; Morehead, F. F.; Koch, M. J. *J. Colloid Sci.* 1961, 16, 327-344.
8. Grunert, M.; Winter, W. T. *J. Polym. Environ.* 2002, 10, 27-30.
9. Favier, V.; Chanzy, H.; Cavaillé, J. Y. *Macromolecules* 1995, 28, 6365-6367.
10. Rånby, B. G. *Discuss. Faraday Soc.* 1951, 11, 158-164.
11. Marchessault, R. H.; Morehead, F. F.; Walter, N. M. *Nature* 1959, 184, 632-633.
12. Revol, J.-F.; Bradford, H.; Giasson, J.; Marchessault, R. H.; Gray, D. G. *Int. J. Biol. Macromol.* 1992, 14, 170-172.
13. Dong, X. M.; Kimura, T.; Revol, J.-F.; Gray, D. G. *Langmuir* 1996, 12, 2076-2082.
14. Dong, X. M.; Revol, J.-F.; Gray, D. G. *Cellulose* 1998, 5, 19-32.
15. Araki, J.; Wada, M.; Kuga, S.; Okano, T. *Colloids Surf, A* 1998, 142, 75-82.
16. Onsager, L. *Ann. N.Y. Acad. Sci.* 1949, 51, 627-659.
17. Hermans, J. *J. Polym. Sci., Part C: Polym. Symp.* 1963, 2, 129-144.
18. Beck, S. C. *Phase Separation Phenomena in Cellulose Nanocrystal Suspensions Containing Dextran-Dye Derivatives.* Ph.D. Thesis, McGill University: Montréal, 2007.
19. de Gennes, P. G. *The Physics of Liquid Crystals.* Oxford: Clarendon Press, 1974.
20. Revol, J.-F.; Godbout, L.; Gray, D. G. 1997. *Solidified liquid crystals of cellulose with optically variable properties*, U.S. Pat. No. 5,629,055, May 13, to Paprican.
21. Revol, J.-F.; Godbout, L.; Gray, D. G. *J. Pulp Pap. Sci.* 1998, 24, 146-149.
22. de Vries, Hl. *Acta. Cryst.* 1951, 4, 219-226.
23. Roman, M.; Gray, D. G. *Langmuir* 2005, 21, 5555-5561.
24. Edgar, C. D.; Gray, D. G. *Cellulose* 2001, 8, 5-12.
25. Bondeson, D.; Mathew, A.; Oksman, K. *Cellulose* 2006, 13, 171-180.
26. Cranston, E. D.; Gray, D. G. *Biomacromolecules* 2006, 7, 2522-2530.
27. Wågberg, L.; Decher, G.; Norgren, M.; Lindström, T.; Ankerfors, M.; Axnäs, K. *Langmuir* 2008, 24, 784-795.
28. Dong, X. M.; Gray, D. G. *Langmuir* 1997, 13, 2404-2409.
29. Edgar, C. D.; Gray, D. G. *Cellulose* 2003, 10, 299-306.
30. Lefebvre, J.; Gray, D. G. *Cellulose* 2005, 12, 127-134.
31. Isogai, A.; Kato, Y. *Cellulose* 1998, 5, 153-164.
32. Araki, J.; Wada, M.; Kuga, S.; Okano, T. *J. Wood Sci.* 1999, 45, 258-261.
33. Araki, J.; Wada, M.; Kuga, S. *Langmuir* 2001, 17, 21-27.
34. Revol, J.-F.; Marchessault, R. H. *Int. J. Biol. Macromol.* 1993, 15, 329-335.
35. Murray, S. B.; Neville, A. C. *Int. J. Biol. Macromol.* 1998, 22, 137-144.
36. Dogic, Z.; Fraden, S. *Langmuir* 2000, 16, 7820-7824.

The invention claimed is:

1. A method of producing an iridescent solid film comprising electrostatically charged colloidal rod-like particles having an iridescent pattern therein, comprising
   disposing a pattern-defining member in a heat transfer zone between an aqueous suspension of the rod-like particles and a source of heat, and
   evaporating water from said suspension with heat from said source to form a solid film comprising said rod-like particles,
   said pattern-defining member having a heat transfer rate for transfer of heat from said source to said suspension different from the heat transfer rate of said heat transfer zone.

2. A method of producing an iridescent solid film comprising electrostatically charged colloidal rod-like particles having an iridescent pattern therein, comprising: subjecting an aqueous suspension of electrostatically charged colloidal rod-like particles to heat to evaporate water from said suspension with formation of a solid film comprising said colloidal rod-like particles, wherein exposure of the suspension to the heat is controlled so that the solid film is formed with film zones therein having been subjected to different levels of heat transfer whereby said zones define the pattern.

3. A method according to claim 1, wherein said rod-like particles are nanocrystalline cellulose (NCC).

4. A method according to claim 2, wherein said rod-like particles are nanocrystalline cellulose (NCC).

5. A method according to claim 3, wherein said heat transfer rate for transfer of heat from said source to said suspension of said pattern-defining member is greater than the heat transfer rate of said heat transfer zone.

6. A method according to claim 3, wherein said nanocrystalline cellulose is a sulfated cellulose.

7. A method according to claim 6, wherein said sulfated cellulose is in a neutral counterion form.

8. A method according to claim 7, wherein said neutral counterion form is an alkali metal form.

9. A method according to claim 8, wherein said alkali metal form is a sodium form.

10. A method according to claim 3, wherein said heat heats said suspension at a temperature of 30 to 105° C.

11. A method according to claim 3, wherein said suspension contains a plasticizer for said solid film.

12. A method according to claim 11, wherein said plasticizer is polyvinyl alcohol.

* * * * *